United States Patent [19]
Matsumoto et al.

[11] Patent Number: 5,284,930
[45] Date of Patent: Feb. 8, 1994

[54] PROCESS FOR PURIFYING VINYLPHENOL POLYMERS FOR USE AS PHOTORESIST MATERIALS

[75] Inventors: Tadashi Matsumoto, Omiya; Mitsuru Akaho, Kimitsu, both of Japan

[73] Assignee: Maruzen Petrochemical Co., Ltd., Tokyo, Japan

[21] Appl. No.: 980,303

[22] Filed: Nov. 23, 1992

[30] Foreign Application Priority Data

Nov. 28, 1991 [JP] Japan .................................. 3-339728

[51] Int. Cl.$^5$ ................................................ C08F 6/08
[52] U.S. Cl. ...................................... 528/482; 528/483; 528/493; 528/494; 528/495; 430/281
[58] Field of Search ................ 528/483, 482, 493, 494, 528/495; 430/281

[56] References Cited

FOREIGN PATENT DOCUMENTS 3346888 7/1984 Fed. Rep. of Germany .
103604 4/1989 Japan .

OTHER PUBLICATIONS

Japanese Patent Laid-Open No. 1-132619.
Japanese Patent Laid-Open No. 1-103604—Hei 1 (1989).
Japanese Patent Laid-Open No. Sh 60 (1985) 58407.

*Primary Examiner*—Bernard Lipman
*Assistant Examiner*—Tom Weber
*Attorney, Agent, or Firm*—Melvin I. Stoltz

[57] ABSTRACT

Recently, vinylphenol polymers have received special attention as materials for photoresists, since these materials have excellent transmittance of deep ultraviolet light in the neighborhood of 248 nm. Although particularly useful in this regard, vinylphenol polymers usually contain metal impurities, while photoresists must have high transmittance and extremely low metal content. As a result, vinylphenol polymers satisfying these requirements have not been available on industrial scale. In the present invention, a process for producing such purified vinylphenol polymers, both economically and easily, is realized. In the process of this invention, the vinylphenol polymer solution is hydrogenated and the hydrogenated solution is contacted with a strongly acidic cation exchange resin. In this way, substantially metal-free vinylphenol polymers are obtained.

18 Claims, No Drawings

PROCESS FOR PURIFYING VINYLPHENOL POLYMERS FOR USE AS PHOTORESIST MATERIALS

BACKGROUND OF THE INVENTION

1. Field of the Invention

The present invention relates to a process for purifying vinylphenol polymers, and, more particularly, to a process for purifying vinylphenol polymers for obtaining purified vinylphenol polymers having a superior light transmittance and an extremely low metal impurity content required for photoresist materials which are used in fine works for the manufacture of super integrated semiconductor elements.

2. Description of the Prior Art

The degree of integration in semiconductor elements is infinitely going up so that the lithography technology for processing high integrated simiconductors must endlessly cope with super miniaturization requirements. A specific requirement in the current pattern-forming technology is capability of producing miniature patterns of the order of 0.5 μm or less. In recent years, deep ultraviolet lights having a wavelength shorter than ultraviolet lights conventionally used for exposing photoresists are regarded to be a more favorable exposure means in order to promote the pattern resolving capability. The KrF excimer laser having a wavelength of 248 nm is supposed to be applied to the generation of deep ultraviolet lights. Several types of photoresists to be exposed to the KrF excimer laser lights have been developed. They are a two component type comprising a photosensitive material and a base resin; a three component type comprising a photosensitive material, a dissolution controlling agent, and a base resin; a three component type comprising a photosensitive material, a cross-linking agent, and a base resin; and the like. Here, the base resin means a component forming films when the photoresist is coated onto silicon wafer surfaces and playing a major role in resisting the etching when the silicon wafer substrates are etched after exposure to lights and development. Novolak-type resins have been widely used as base resins for positive-type resists containing a quinone azide photosensitive agent to be exposed to ultraviolet lights. Since novolak-type resins have a strong absorbancy for deep ultraviolet lights in the neighborhood of 248 nm, preventing the short wavelength lights from reaching the bottom of the resist film, they cannot provide a sufficient resolve of minute patterns when applied to a photoresist material to be exposed to excimer laser lights. Because of this, a number of materials have been studied with respect to their applicability to a base resin for short wavelength photoresists. These studies revealed the extreme usefulness of vinylphenol-type polymers, such as poly-p-vinylphenol, etc., as resins satisfying the requirements not only of the light transmittance but also of the solubility in alkaline solution, the plasma resistance, and the like.

Even though vinylphenol polymers inherently exhibit excellent transmittance for deep ultraviolet lights in the neighborhood of 248 nm, such vinylphenol polymers with excellent transmittance cannot be obtained unless special precautions are taken in the manufacturing process, such as sufficient purification of raw monomers, adoption of a low temperature procedure avoiding heating in the polymerization of monomers and isolation of the polymer product from the polymerization reaction mixture, and the like. However, applying these procedures to an industrial production is very difficult and uneconomical because of the unstable nature of vinylphenol monomers which prevents their easy handling and storing.

In order to improve a low transmittance of conventional vinylphenol polymers manufactured from crude vinylphenol monomer as a starting raw material, a process has been proposed, in which the vinylphenol polymers are contacted with hydrogen in the presence of a Group VIII metal catalyst (Japanese Patent Laid-open No. Hei 1 (1989)-103604). The process has made it possible to easily manufacture vinylphenol polymers having excellent transmittance for deep ultraviolet lights in the neighborhood of 248 nm in an industrial scale.

One of the important properties other than light transmittance required for photoresists exposed to short wavelength lights from the excimer laser or the like is their low metal content. Metals contained in photoresist materials function as pollutants which inhibit the functions of semiconductor elements by attaching to silicon wafer substrates when the plasma etching is performed after the pattern formation by exposure and development. Therefore, minimizing the metal impurity content in a base resin which is the major component constructing photoresists is demanded as a matter of course. Metal contents allowable in base resins have been markedly lowered along with the progress of miniaturization of pattern sizes; i.e., an extremely low level metal content, for example, several tens ppb to several ppb, is required for each metal, e.g., sodium, iron, etc., for the manufacture of semiconductor elements with a pattern size of 0.5 μm or less. However, the content of each metal, e.g., sodium, iron, etc., in vinylphenol polymers manufactured by conventional processes generally exceeds 100 ppb. There have been no technology known in the art to remove these metals from vinylphenol polymers. Thus, no vinylphenol polymer with a high transmittance for deep ultraviolet lights and a low metal content has been manufactured heretofore.

SUMMARY OF THE INVENTION

An object of the present invention is to provide a process for easily and economically manufacturing vinylphenol polymers having a high transmittance for deep ultraviolet lights and an extremely low metal content. Vinylphenol polymers having such superior characteristics have not yet been obtained.

As a result of extensive studies in order to achieve the above object, the present inventors have found that metal contents in vinylphenol polymers can easily be decreased to an extremely low level by dissolving them into a solvent and contacting the solution with a strongly acidic cation exchange resin. Further studies by the present inventors have revealed that if the same solvent is used in the combination of a hydrotreating process disclosed, for example, in Japanese Patent Laid-open No. Hei 1 (1989)-103604, in which a solution of vinylphenol polymer in a solvent is contacted with hydrogen in the presence of a Group VIII metal catalyst and said process for removing metals from a vinylphenol polymer discovered by the present inventors, in which a solution of the vinylphenol polymer is contacted with a strongly acidic cation exchange resin, and the solution from the former hydrotreating process is fed, as is or after adjusting its polymer content, as needed, to the latter process for removing metals, both the promotion of the transmittance for deep ultraviolet lights and the remarkable reduction of the metal content can easily be achieved at a low cost. This finding has led to the completion of the present invention.

Thus, the gist of the present invention resides in a process for purifying a vinylphenol polymer for use as a photoresist material characterized by dissolving the vinylphenol polymer into a solvent to make a solution, submitting the solution to a hydrotreatment step in which the solution is contacted with hydrogen in the presence of a Group VIII metal catalyst, and submitting the hydrogenated solution to a metal removing step in which the hydrogenated solution is contacted with a strongly acidic cation exchange resin.

DETAILED DESCRIPTION OF THE INVENTION

The following vinylphenol polymers are given to which the process of the present invention can be applicable.

(a) Homopolymers of vinylphenol such as p-vinylphenol, m-vinylphenol, or the like. If desired, homopolymers may be those made from a monomer mixture of vinylphenol isomers, e.g., p- and m-isomers.

(b) Copolymers of vinylphenol and comonomers, e.g., styrene, acrylic acid, acrylic acid esters, methacrylic acid, methacrylic acid esters, maleic anhydride, maleic acid, maleic acid esters, maleimides, or the like, with the content of these comonomers being 70 mol % or less, preferably 50 mol % or less.

(c) Esterified or etherified delivertives of said vinylphenol polymers (a) or (b) in which the phenolic hydroxy groups of the vinylphenol polymers are partly or fully esterified with acetic acid, benzoic acid, or the like, or are party or fully etherified with methanol, tert-butyl alcohol, trimethylsilyl alcohol, or the like.

(d) Vinylphenol polymers (a) or (b) having nuclear substituent. The substituent may be alkyl group, halogen, or methylol group, or the like.

(e) Modified vinylphenol polymers prepared by heat-fusion of vinylphenol polymers (a) or (b), or a mixture of vinylphenol polymers (a) or (b) with a novolak-type phenol resin.

In the purification of a vinylphenol polymer according to the process of the present invention, the vinylphenol polymer is first dissolved into a solvent to make a solution and submitted to a hydrotreatment step wherein said solution is contacted with hydrogen in the presence of Group VIII metal catalyst. The deep ultraviolet light transmittance property of the vinylphenol polymer is improved by this treatment. This step can be easily performed according to such a process as disclosed in Japanese Patent Laid-open No. Hei 1 (1989)-103604.

Solvents which can be used in the hydrotreatment step are those capable of dissolving vinylphenol polymers, stable in the hydrotreatment, and usable in common to the next metal removing step. Solvents which are usable in the next metal removing step should be those capable of dissolving vinylphenol polymers, stable without being deteriorated or decomposed when contacted with a strongly acidic cation exchange resin and unreactive with vinylphenol polymers, and the solvents can suitably be selected depending on the types of vinylphenol polymers and the metal removing operation conditions. As the solvents commonly usuable in both hydrogenation step and metal removing step, alcohols, e.g., methanol, ethanol, isopropanol, etc.; esters, e.g., ethyl acetate, ethyl lactate, etc.; cyclic ethers, e.g., tetrahydrofuran, dioxane, etc.; ketones, e.g., acetone, methyl ethyl ketone, etc.; alkylene glycol ethers or esters, e.g., ethylene glycol ethyl ether, ethylene glycol ethyl ether acetate, ethylene glycol dimethyl ether, diethylene glycol dimethyl ether, propylene glycol monomethyl ether acetate, etc.; and the like can be cited, but not limited thereto. The amount of the solvent to be used in the hydrogenation step is usually in the range which provides a polymer concentration of 10–50% by weight in the solution, although there is no special need that this range must be maintained. Nickel, cobalt, palladium, platinum, and rhodium are preferred Group VIII metal catalysts. Either the metal itself can be used as the catalyst or they may be supported by a metal oxide carrier. Nickel and cobalt can be used as, so called, Raney type.

The contact of a vinylphenol polymer and hydrogen in the presence of these metal catalyst is effected by a batch system using an autoclave, a continuous system of a fixed-bed flowing type, or the like. A temperature range for the hydrotreatment is 50°–300° C., and preferably 150°–250° C. A hydrogen pressure of 10–200 Kg/cm$^2$ is preferable, with a more preferable pressure range being 30–100 Kg/cm$^2$. A preferable amount of the catalyst is, in the case of a batch system, about 0.01–10% by weight, calculated as metal, of the polymer, and in the case of a flowing type system, an amount to make weight hourly space velocity (WHSV) of the polymer for the catalyst about 0.1–10 kg/kg. hr on the basis of the vinylphenol polymer to be treated. In batch system, the reaction time is usually within a range of 0.1–10 hr, and more preferably 0.5–5 hr. The preferred period of time for which the hydrotreatment is effected can be suitably determined depending on the type and amount of the catalyst, other operating conditions, the temperature, etc., characteristics of the polymer to be hydrogenated, and the like.

The solution after the hydrotreatment is sent to the metal removing step. In this instance, the catalyst is removed by filtration if it is contained in the solution. If required in order to establish desired conditions in the metal removing step, the polymer content in the solution may be adjusted by adding a solvent or by removing a portion of the solvent by evaporation or the like. The same solvent as used in the hydrotreatment step is preferably used as a solvent to be added in this instance. If two kinds of solvents are used in the hydrotreatment step, however, either one of the solvents may be added. Conversely, if desired, two or more kinds of solvents may be added prior to the metal removing step, even in the case where a single solvent is used in the hydrotreatment step.

The metal removing step comprises contacting the hydrotreated solution with a strongly acidic cation exchange resin. Various metals, such as alkali metals, alkaline earth metals, and transition metals, e.g., sodium, potassium, calcium, iron, nickel, etc., contained in vinylphenol polymers can be removed by the metal removing step. The concentration of the vinylphenol polymer in the solution submitted to the metal removing step is preferably a concentration to make the viscosity of the resulting solution 10 poise or less at the temperature at which the solution is treated in this step. The relationship between the polymer concentration and the viscosity of a solution is dependent on the types of the solvent and the polymer, and can be easily determined by the measurement of the viscosity of the solution. Taking the case where the solvent is a mixture of methanol (10 parts by weight) and isopropanol (90 parts by weight) and the polymer is a hydrotreated poly-p-vinylphenol having a weight average molecular weight of 5,000 as an example, the viscosity at 25° C. is 1.4 poise when the polymer concentration is 33% by weight, 0.5 poise when the polymer concentration is 27% by weight, and 0.25 poise when the polymer concentration is 20% by weight. Generally, the lower the viscosity of the solution is, the higher is the rate of metal removal. According to the studies of the present inventors, when the viscosity of the solution is less than about 1 poise, removal of metals can be effected at a remarkably high level. Therefore, it is preferable to maintain the viscosity of the solution 1 poise or less, if a high degree of metal removal is desired. Furthermore, it is preferable that the polymer concentration of a hydrotreated solution is adjusted prior to the metal removing operation so as to meet with the concentration corresponding to the intended degree of the metal removal. There are no specific limitations as to the lower side concentration of the polymer in the solutions, although an excessive reduction of the concentration requires a large amount of the solvent, rendering the process uneconomical. In general, a polymer concentration making the viscosity of the solution about 0.1 poise at the treating temperature is fully sufficient. Therefore, preferable viscosity range is between 0.1 and 1 poise.

Commercially available strongly acidic cation exchange resins can be used in the present invention. Among them, cation exchange resins of sulfonated styrene-divinylbenzene cross-linked polymer are preferred. There are two types of strongly acidic cation exchange resins, one is the porous-type made of porous resins and the other one is the gel type which is made of nonporous resins. Surprisingly, the ge type can be used in the present invention as well as the porous-type. It is desirable to treat the strongly acidic cation exchange resin with an acid to sufficiently remove $Na^+$ and the like and increase the substituted amount of $H^+$ prior to use. The batch agitation method and the fixed-bed flowing method are applicable to the contact of vinylphenol polymers and the strongly acidic cation exchange resin, with the latter being more preferable. The period of time required for the contact is usually in the range in terms of liquid hourly space velosity (LHSV) of 0.2-5 $hr^{-1}$ on the basis of the solution of the vinylphenol polymer, in the case of the fixed-bed flowing method, even though there are no specific need that the range must be maintained. The temperature at which the materials are contacted is preferably 0°-100° C., and more preferably 10°-50° C. The rate of metal removal is lowered at a low temperature, since the solution of vinylphenol polymers has a high viscosity at low temperatures, requiring a large amount of solvent to reduce the viscosity to a suitable range. On the other hand, a higher temperature may impair qualities of the vinylphenol polymers or the solvent, may cause release of acids from the strongly acidic cation exchange resin, or may deteriorate the strongly acidic cation exchange resin, even though the low viscosity requirement for easy removal of metals is satisfied at a high temperature.

In a preferred embodiment, in this metal removing step, in order to seize anions contained in vinylphenol polymers or acids released from the strongly acidic cation exchange resin, anion exchange resins or chelating resins can be used together with the strongly acidic cation exchange resin. These anion exchange resins or chelating resins may be used as a mixed bed together with the strongly acidic cation exchange resin or as a two-bed system in which two types of resins are arranged in series.

Microfilters may be provided before and after the ion exchange resin treatment in order to remove by filtration insoluble impurities contained in the vinylphenol polymers or fine particles which might be flown out from the ion exchange resins. The strongly acidic cation exchange resin with a decreased metal-removing capability can be repeatedly used after regeneration by a washing treatment with solvents, water, acids, and the like.

The target polymer is then collected from the solution containing vinylphenol polymers, of which the deep ultraviolet light transmittance has been improved and the metal impurity content has been reduced by the process described above, by removing the solvent therefrom. This can be achieved, for example, by a process comprising precipitation of polymers produced by pouring the solution into water, collection of the precipitate by filtration, and drying the precipitate or a process comprising evaporation of the solvent from the solution under vacuum. In addition, the solution obtained by the process of the present invention can be used as is, or after dilution or concentration, if the solvent used in the hydrotreatment step and the metal removing step is the same solvent to be used for the photoresist in which the purified vinylphenol polymer is used.

Purified vinylphenol polymers with a high deep ultraviolet light transmittance and a low metal contents, which have not been manufactured heretofore, can be provided by the present invention. The purified vinylphenol polymers can be obtained economically by a simple procedure comprising submitting a solution from the hydrotreatment step to a metal removing step, wherein the same solvent can be used in common to the both steps, enabling its simple and easy recovery and reuse. The high purity products manufactured by the process of the present invention is suitably used as materials for short wavelength deep ultraviolet light photoresist which are used in fine works for the manufacture of super integrated semiconductor elements. In fact, when a vinylphenol polymer is hydrogenated in a suitable condition and treated with a strongly acidic cation exchange resin at a viscosity of 1.0 poise or less, a purified vinylphenol polymer having an extinction coefficient measured at 248 nm of 1200 $cm^2/g$ or less and having sodium, iron and nickel contents of less than 10 ppb, respectively, can be obgtained. Such a purified vinylphenol polymer is an especially suitable material as a photoresist for 248 nm deep ultraviolet light exposure.

DESCRIPTION OF THE PREFERRED EMBODIMENTS

The present invention is hereinafter illustrated in more detail by way of examples, which are not intended to be limiting the present invention. In examples hereinbelow, proportions, parts and percentages are expressed by weight, unless otherwise indicated, with the exception of light transmittance.

EXAMPLE 1

A solution of 1,000 g of poly-p-vinylphenol (weight average molecular weight: 5,000) dissolved in 2,000 g of a mixed solvent of methanol (10 parts) and isopropanol (90 parts) and 30 g of a nickel catalyst carried on diatomaceous earth (G-49B: Tradename, a product of Nissan Gardler Catalyst Co., Ltd.) were charged into an autoclave with a net volume of 10 liter. After replacing the atmosphere with nitrogen several times and then with hydrogen several times, the mixture was stirred at a hydrogen pressure of 50 Kg/cm$^2$, while heating to 200° C., and held at this temperature for 90 minutes. After cooling, the reaction mixture was filtered through a 1 μm filter to remove the catalyst. The hydrotreated solution thus obtained had a resin content of 33% and a viscosity of 1.4 poise at 25° C.

Sixty (60) ml of a commercially available high porous-type strongly acidic cation exchange resin (RCP160H: Tradename, manufactured by Mitsubishi Kasei Corp., sulfonated styrene-divinylbenzene cross-liked polymer) was packed into an adsorption column made of glass with an internal diameter of 20 mm, treated with 1 liter of 3% hydrochloric acid, and washed with pure water until the effluent water showed pH 7. The adsorption column was installed in a clean bench provided with a class 100 air injection port and washed first with 500 ml of electronic grade (EL) methanol and then with 500 ml of a mixed solvent of EL methanol (12 parts) and EL isopropanol (5 parts) fed via a micro-pump through a teflon tube. Then, said solution of the hydrotreated modified poly-p-vinylphenol was fed to the adsorption column by the micro-pump at a rate of LHSV of 0.2 hr$^{-1}$.

After completely replacing inside of the adsorption column with said solution, the treated effluents were collected in a polyethylene container which had been washed with pure water and EL methanol in advance. The temperature in the clean bench was kept at 25° C. while the treated effluents were collected.

The content of each metal in the resin portion of the treated solution were measured by a frameless atomic absorption spectrophotometer to find that the resin contained 24 ppb of sodium, 28 ppb of iron, and 28 ppb of nickel. The solution was dropped into pure water of 10 times in volume to deposit the polymer precipitate. The precipitate was collected and dried at 50° C. under vacuum. The light transmittance, measured on the polymer solution in ethanol at a concentration of $1.0 \times 10^{-4}$ g/ml by a spectrophotometer at a wavelength of 248 nm by using a cell with a length of 1 cm, was 79.5% which corresponds to the extinction coefficient of 996 cm$^2$/g. In the following examples, measurement of the light transmittance is conducted in the same manner as in Example 1.

Poly-p-vinylphenol before the hydrotreatment and metal removing steps had a sodium content of 210 ppb, iron content of 190 ppb, and transmittance at 248 nm of 55.1%. Poly-p-vinylphenol on which only the hydrotreatment was effected had the same sodium and iron contents as those of before the hydrotreatment and metal removing steps, although its nickel content was 95 ppb and the transmittance at 248 nm was 79.0%.

Incidentally, the metal contents shown above are based on the vinylphenol polymer per se and hereinafter the same.

EXAMPLES 2-4

The same hydrotreated solution obtained by the hydrotreatment in Example 1 was diluted with EL methanol at dilution rates different from the dilution rate of Example 1. The diluted solutions were passed through the adsorption column in the same manner as in Example 1 to remove metals therefrom. The results are shown in Table 1, in which the results of Example 1 are also shown together.

EXAMPLE 5

The same hydrotreated solution obtained by the hydrotreatment in Example 1 was passed through the adsorption column in the same manner as in Example 1, except that the temperature was 40° C. and the LHSV was 1.0 hr$^{-1}$. The results are shown in Table 1.

TABLE 1

| | Examples | | | | |
|---|---|---|---|---|---|
| | 1 | 2 | 3 | 4 | 5 |
| Concentration of solution*1 (%) | 33 | 27 | 20 | 12 | 33 |
| Viscosity of solution*1 (poise) | 1.4 | 0.5 | 0.25 | 0.15 | 0.7 |
| LHSV (hr$^{-1}$) | 0.2 | 1.5 | 1.2 | 1.2 | 1.0 |
| Temperature (°C.) | 25 | 25 | 25 | 25 | 40 |
| Transmittance at 248 nm*2 (%) | 79.5 | 79.1 | 79.2 | 78.9 | 77.2 |
| Extinction coefficient*3 (cm$^2$/g) | 996 | 1018 | 1013 | 1029 | 1124 |
| Metal content (ppb) | | | | | |
| Sodium | 24 | 6 | 5.5 | 3 | 8 |
| Iron | 28 | 3 | less than 0.5 | 3 | 5 |
| Nickel | 28 | less than 4 | less than 3 | — | — |

*1: The solution to be charged into metal removing step.
*2: Measured by a spectrophotometer using a cell with a length of 1 cm, at a polymer concentration of $1.0 \times 10^{-4}$ g/ml of ethanol.
*3: Calculated from the value of transmittance.

EXAMPLES 6 AND 7

Poly-p-vinylphenol (weight average molecular weight: 5,000, having different metal contents and a different light transmittance as that used in Example 1) was hydrotreated in the same manner as in Example 1 to obtain a hydrotreated solution with a resin concentration of 33% and a viscosity of 1.4 poise at 25° C.

Sixty (60) ml of a commercially available gel type strongly acidic cation exchange resin (SKIB: Tradename, manufactured by Mitsubishi Kasei Corp., sulfonated styrene-divinylbenzene cross-liked polymer) was packed into an adsorption column made of glass with an internal diameter of 20 mm, treated with 5 liter of 3% hydrochloric acid, and washed with pure water until the effluent water showed pH 7. The solution of the above-mentioned hydrotreated modified poly-p-vinylphenol was treated in the same manner as in Example 1 using this column, except that LHSV was 1.2 hr$^{-1}$. The results are shown in Table 2 as Example 6.

In the same manner as above, the hydrotreated solution was diluted with EL methanol to a resin concentration of 13%, and then the metal removal procedure was carried out. The results are shown in Table 2 as Example 7.

Poly-p-vinylphenol before the hydreotreatment and metal removing steps had a sodium content of 205 ppb, potassium content of 15 ppb, calcium content of 28 ppb, iron content of 52 ppb, and transmittance at 248 nm of 51.0%. Poly-p-vinylphenol on which only the hydrotreatment was effected had the same sodium, potassium, calcium, and iron contents as those of before the hydrotreatment and metal removing steps, although its nickel content was 110 ppb and the transmittance at 248 nm was 80.0%.

TABLE 2

|  | Example 6 | Example 7 |
|---|---|---|
| Concentration of solution*1 (%) | 33 | 13 |
| Viscosity of solution*1 (poise) | 1.4 | 0.15 |
| LHSV (hr.$^{-1}$) | 1.2 | 1.2 |
| Transmittance at 248 nm*2 (%) | 80.1 | 79.5 |
| Extinction coefficient*3 (cm$^2$/g) | 964 | 996 |
| Metal content (ppb) | | |
| Sodium | 8 | less than 2.5 |
| Potassium | 2.5 | 1.5 |
| Calcium | 5.0 | 1.5 |
| Iron | 33 | 6.7 |
| Nickel | 48 | less than 8 |

*1: The solution to be charged into metal removing step.
*2: Measured by a spectrophotometer using a cell with a length of 1 cm, at a polymer concentration of 1.0 × 10$^{-4}$ g/ml of ethanol.
*3: Calculated from the value of transmittance.

EXAMPLE 8

A solution of 1,000 g of a copolymer of p-vinylphenol (68 mol) and styrene (32 mol) (weight average molecular weight: 3,400) dissolved in 3,000 g of ethanol and 20 g of a palladium catalyst (supported on alumina, manufactured by Engelhard Corp.) were charged into an autoclave with a net volume of 10 liter. After replacing the atmosphere several times with nitrogen and then several times with hydrogen, the mixture was stirred at a hydrogen pressure of 50 Kg/cm$^2$ while heating to 180° C., and held at this temperature for 4 hours. After cooling, the reaction mixture was filtered through a 1 μm filter to remove the catalyst. The hydrotreated solution was passed through the adsorption column in the same manner as in Example 1, except that the LHSV was 1.2 hr$^{-1}$, to remove metals. The resin had transmittance at 248 nm of 61.2% before the processing, but 80.1% which corresponds to the extinction coefficient of 964 cm$^2$/g after the processing; the sodium content of 286 ppb before the processing, but 6 ppb after the processing; and iron content of 170 ppb before the processing, but 8 ppb after the processing.

EXAMPLE 9

A heat fused poly-p-vinylphenol (weight average molecular weight: 23,000, number average molecular weight: 4,200) was obtained by a heat-fusing treatment of poly-p-vinylphenol (weight average molecular weight: 6,500, number average molecular weight: 3,500) at 250° C. for 4 hours according to the method of Japanese Patent Laid-open No. Sho 60 (1985)-58407. A solution of 1,000 g of this modified poly-p-vinylphenol in 2,000 g of ethanol and 20 g of a palladium catalyst (supported on alumina, manufactured by Engelhard Corp.) were charged into an autoclave with a net volume of 10 liter. After replacing the atmosphere several times with nitrogen and then several times with hydrogen, the mixture was stirred at a hydrogen pressure of 50 Kg/cm$^2$ while heating to 200° C., and held at this temperature for 90 minutes. After cooling, the reaction mixture was filtered through a 1 μm filter to remove the catalyst. The hydrotreated solution was passed through the adsorption column in the same manner as in Example 1, except that the LHSV was 1.2 hr$^{-1}$, to remove metals. The resin had transmittance at 248 nm of 40.2% before the processing, but 70.5% which corresponds to the extinction coefficient of 1518 cm$^2$/g after the processing; the sodium content of 295 ppb before the processing, but 30 ppb after the processing; and iron content of 335 ppb before the processing, but 30 ppb after the processing.

EXAMPLE 10

A solution of 1,000 g of tert-butylated poly-p-vinylphenol (degree of butylation: 0.20 tert-butyl group/aromatic nucleus, weight average molecular weight: 5,400) dissolved in 3,000 g of diethylene glycol dimethyl ether was prepared and hydrotreated in the same manner as in Example 8. The hydrotreated solution was passed through the adsorption column in the same manner as in Example 1 to remove metals. The resin had transmittance at 248 nm of 33.1% before the processing, but 69.2% which corresponds to the extinction coefficient of 1599 cm$^2$/g after the processing; the sodium content of 512 ppb before the processing, but 9 ppb after the processing; and iron content of 215 ppb before the processing, but 7 ppb after the processing.

What is claimed is:

1. A process or purifying a vinylphenol polymer for use as a photoresist material characterized by dissolving the vinylphenol polymer into a solvent to make a solution, submitting said solution to a hydrotreatment step in which said solution is contacted with hydrogen in the presence of a Group VIII metal catalyst, and submitting said hydrogenated solution to a metal removing step in which said hydrogenated solution is contacted with a strongly acidic cation exchange resin.

2. A process according to claim 1, wherein the concentration of said hydrogenated solution is adjusted before said hydrogenated solution is submitted to said metal removing step.

3. A process according to claim 1, wherein the concentration of said vinylphenol polymer in said solution to be charged into said hydrotreatment step is within a range of 10-50% by weight and the concentration of said hydrogenated solution to be charged into said metal removing step is a concentration making the viscosity of said solution 10 poise or less at the temperature of said metal removing step.

4. A process according to claim 3, wherein said viscosity is 1 poise or less.

5. A process according to claim 4, wherein said viscosity is within a range of 0.1-1 poise.

6. A proceses according to claim 1, wherein said hydrotreatment step is conducted at a temperature of 50°-300° C. under hydrogen pressure of 10-200 Kg/cm$^2$.

7. A proccess according to claim 6, wherein said hydrotreatment step is conducted in batch wise by using a hydrogenation catalyst in an amount of 0.01-10% by weight, calculated as metal, of polymer for 0.1-10 hr under stirring.

8. A process according to claim 6, wherein said hydrotreatment step is conducted in a fixed-bed flow method by using a polymer charge rate in the term of weight hourly space velocity of 0.1-10 (kg/kg) hr$^{-1}$.

9. A process according to claim 1, wherein said metal removing step is conducted at a temperature of 0°-100° C.

10. A process according to claim 9, wherein said metal removing step is conducted in a fixed-bed flow method by using polymer solution charge rate in the term of liquid hourly space velocity of 0.2-5 hr$^{-1}$.

11. A process according to claim 1, wherein said solvent is selected from the group consisting of alcohols, esters, cyclic ethers, ketones, alkylene glycol ethers and alkylene glycol esters.

12. A process according to claim 11, wherein said solvent is selected from the group consisting of alcohols, cyclic ethers and alkylene glycol ethers.

13. A process according to claim 1, wherein said strongly acidic cation exchange resin is a porous type resin or a gel type resin.

14. A process according to claim 7, wherein said metal removing step is conducted at a temperature of 0°–100° C.

15. A process according to claim 14, wherein said metal removing step is conducted in a fixed-bed flow method by using polymer solution charge rate in the term of liquid hourly space velocity of 0.2–5 hr$^{-1}$.

16. A process according to claim 15, wherein said solvent is selected from the group consisting of alcohols, esters, cyclic ethers, ketones, alkylene glycol ethers and alkylene glycol esters.

17. A process according to claim 16, wherein said solvent is selected from the group consisting of alcohols, cyclic ethers and alkylene glycol ethers.

18. A purified vinylphenol polymer for use as photoresist material, prepared by the process defined in claim 4, having an extinction coefficient measured at 248 nm of 1200 cm$^2$/g or less, and having sodium, iron and nickel contents of less than 10 ppb, respectively.

* * * * *